(12) United States Patent
Kao

(10) Patent No.: US 6,189,036 B1
(45) Date of Patent: Feb. 13, 2001

(54) USER ACCESS TO OBJECTS IN GROUP BASED ACCESS CONTROL BASED ON RESULT OF GREATEST COMMON DIVISOR OF ASSIGNED UNIQUE PRIME NUMBERS OF USER AND OBJECT

(75) Inventor: I-Lung Kao, Round Rock, TX (US)

(73) Assignee: International Business Machines Corporation, Armonk, NY (US)

(*) Notice: Under 35 U.S.C. 154(b), the term of this patent shall be extended for 0 days.

(21) Appl. No.: 09/187,070

(22) Filed: Nov. 5, 1998

(51) Int. Cl.$^7$ .......................... G06F 15/16; G06F 15/173
(52) U.S. Cl. ............................... 709/229; 709/225
(58) Field of Search ...................... 709/229, 225

(56) References Cited

U.S. PATENT DOCUMENTS

| | | |
|---|---|---|
| 4,611,272 | 9/1986 | Lomet . |
| 5,113,442 | 5/1992 | Moir . |
| 5,335,346 * | 8/1994 | Fabbio ............................... 711/163 |
| 5,584,022 | 12/1996 | Kikuchi et al. . |
| 5,675,782 * | 10/1997 | Montague et al. .................. 713/201 |
| 5,696,898 * | 12/1997 | Baker et al. ........................ 713/201 |
| 5,991,807 * | 11/1999 | Schmidt et al ..................... 709/225 |

FOREIGN PATENT DOCUMENTS 5692639   12/1979   (JP) .

OTHER PUBLICATIONS

Hwang, J., "A New Access Control Method Using Prime Factorisation", The Computer Journal, 1992, vol. 35, No. 1, pp. 16–20.

\* cited by examiner

Primary Examiner—Krisna Lim
(74) Attorney, Agent, or Firm—David Judson; Jeffrey S. LaBaw

(57) ABSTRACT

An access control mechanism using a grouping system whereby each group is assigned a unique prime number. The resource objects to be accessed are assigned a value that is determined by multiplying all of the group prime numbers from the groups that have access to that resource. Also, each user is assigned to one or more groups and each user has an access number that is a product of the prime numbers assigned to each group. When a particular user desires access to a particular resource object, the greatest common divisor between the resource product and the user product is determined. If the resulting greatest common divisor is greater than one, then the user is allowed access. If the greatest common divisor is one (the lowest prime), the user is denied access.

20 Claims, 2 Drawing Sheets

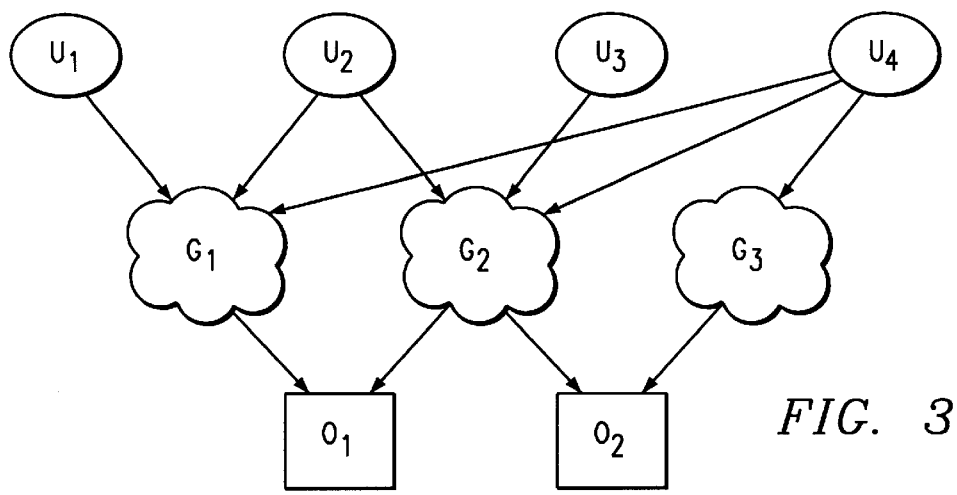
*FIG. 3*
*FIG. 4*
- $P_{G1} = 2$.
- $P_{G2} = 3$.
- $P_{G3} = 5$.
- $M_{U1} = P_{G1} = 2$
- $M_{U2} = P_{G1} * P_{G2} = 2 * 3 = 6$.
- $M_{U3} = P_{G2} = 3$.
- $M_{U4} = P_{G1} * P_{G2} * P_{G3} = 2 * 3 * 5 = 30$.
- $M_{O1} = P_{G1} * P_{G2} = 2 * 3 = 6$.
- $M_{O2} = P_{G2} * P_{G3} = 3 * 5 = 15$
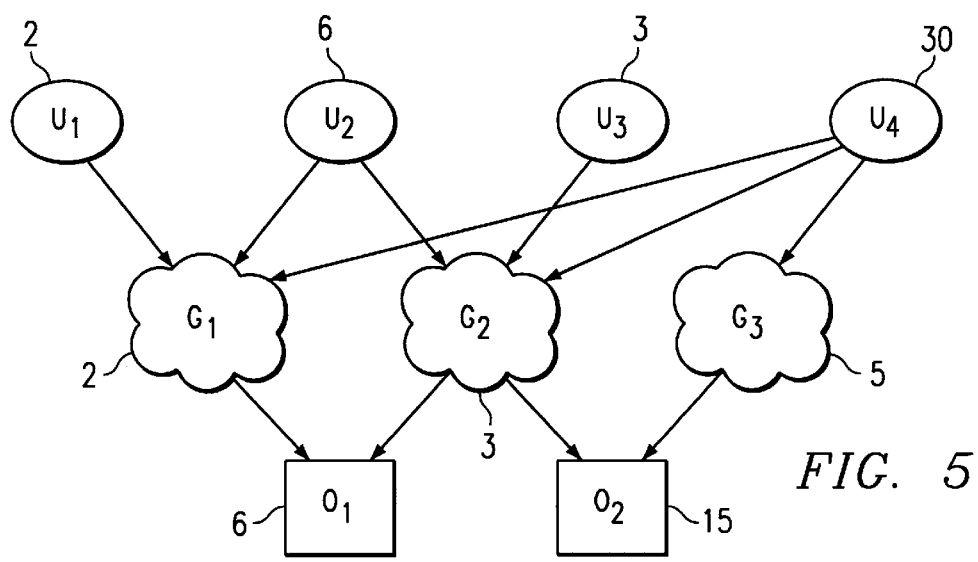
*FIG. 5*

USER ACCESS TO OBJECTS IN GROUP BASED ACCESS CONTROL BASED ON RESULT OF GREATEST COMMON DIVISOR OF ASSIGNED UNIQUE PRIME NUMBERS OF USER AND OBJECT

BACKGROUND OF THE INVENTION

1. Technical Field

The present invention relates generally to access control in computer systems and, in particular, to the use of prime numbers to facilitate group based access control to information resources in the computer system.

2. Description of the Related Art

Group based access control is an access control model in which the authorization to access an object from a user is based on some group information associated with the user and/or the object. This model is commonly employed in popular operating systems, database managers, special-purpose applications, and cross-platform computing infrastructures (e.g., The Open Group Distributed Computing Environment or DCE), due to its close fit human organizational structures. Implementation of this model, however, often results in a large amount of overhead in storage, operation, and administration.

The known group based access control paradigm involves users, groups, and information resource objects. A user is the entity who can access an object with some operations. Each user typically belongs to a number of groups. A group is the entity solely defined for the purpose of access control. Each group typically contains as its members a number of users. An object is the entity that can be accessed by a user. Each object can be accessed with a number of operations, depending upon the object's type. Access control on each operation of an object is group based, i.e. whether a user can access an object with an operation depends upon the groups to which the user belongs. Therefore, each object needs to be associated with some access control information that indicates what group of users are allowed to access the object and in what ways (operations).

The traditional and most commonly used mechanism to implement this model is by an Access Control List (ACL). In this known scheme, each object is associated with an ACL that either lists, for each defined access operation, all the groups that are allowed to access the object (a so-called per-operation based ACL) or lists, for each group that is allowed to access the object, all the operations the group can perform (a so-called per-group based ACL). Each group is also associated with a member list that lists all the users belonging to the group. For ease of user administration, each user can also be associated with a group list that lists all the groups to which the user belongs.

In an enterprise environment whose computing systems and applications employ an ACL group based access control mechanism, each operation request from a user to access an object is potentially expensive. This is because the access control modules of these systems and applications need to traverse the whole ACL associated with the object for that access operation and then check if the user belongs to any one of the groups. Such checking may require traversal of the whole member list of each group or the whole group list of the user. The object authorization is costly at run time (especially the I/O operation to load the ACL from persistent storage to volatile memory), and this mechanism also requires a significant amount of space to store ACLs off-line. Moreover, multiple groups may require access to multiple resources creating a compound and complex access list problem. For each user, a list must be stored listing each group to which the user belongs. Also, for each resource, a list must be stored listing each group which has access to that resource. It is known in the art to assign a prime number to each group, and the access list for resources and the group list for users may be stored as multipliers of these groups of primes. This approach provides an easy storage method, but prior art techniques require computationally intensive methods for decomposing the multipliers to their primes to determine whether a prime number is present on both the users group list and the resources group access list. This technique is illustrated, for example, by Hwang et al. in an article titled "A New Access Control Method Using Prime Factorisation," the Computer Law Journal, Volume 35, No. 1, 1992.

Another known access control technique is to use a prime number assigned to each information resource object. The user is then assigned a number that is a multiple of all of those prime numbers encompassing all access authorities for that user. The determination of whether that particular user has access to a particular resource object is then determined by dividing the prime number assigned to the resource into the access product for the user. If the result is an integer, then access is granted because the prime number for that resource group must be one of the prime numbers used for the access product. This approach, however, is computationally inefficient and also creates a significant administrative burden. In particular, determining every single resource to which a user is entitled access in a system with a large number of resources requires system administrators to tag all of these resources to create the resource access multiplier. In a large system, this technique is simply not feasible.

There remains a need to provide new and efficient techniques for group based access control to information resource objects that do not require ACLs, computationally intensive parsing of prime multiplication factors, or other inefficient or expensive schemes. The present invention solves this important problem.

BRIEF SUMMARY OF THE INVENTION

It is a primary object of the present invention to provide an improved group based access control mechanism.

It is another primary object of this invention to facilitate group based access to information resource objects within a computer system using a simple numerical computation based on prime numbers.

It is still another object of this invention to supplant or supplement the Access Control Lists (ACLs) used to implement a group based access control mechanism.

Yet another object of this invention is to reduce the administration costs associated with known group based access control methods.

It is still another important object of this invention to expedite group based access control to information resource objects in an enterprise environment whose computing systems and applications typically employ an ACL based access control mechanism.

Still another object of the present invention is to enhance the performance and reduce the cost of group based access control in a computer enterprise environment.

These and other objects of the present invention are achieved using an efficient group based access control mechanism based on prime numbers. The efficiency of this inventive scheme results from a unique property of prime numbers. The scheme may be used to completely replace the traditional ACL based access control mechanism or the technique may be integrated to the existing ACL based mechanism to expedite the authorization process.

The described embodiment of the present invention provides an access control system using a grouping system whereby each group is assigned a prime number greater than one. The resources to be accessed are assigned a product that is determined by multiplying all of the group prime numbers from the groups which have access to that resource. Also, each user is assigned to one or more groups and each user has an access number that is a product of the prime numbers assigned to each group. When a particular user desires access to a particular information resource object, the greatest common devisor between the resource product and the user product is determined. If the resulting greatest common devisor is greater than one, then the user is allowed access. If the greatest common devisor is one (the lowest prime), the user is denied access.

Generalizing, the present invention is implemented in a group based access control mechanism wherein each of a plurality of access control groups has an associated group number and a set of one or more users assigned thereto. In particular, a method for controlling access to objects begins by associating each group's group number with a unique prime number. Thereafter, the method assigns each user a user number that is a product of the group numbers (namely, the primes) for the groups to which the user is assigned. Each object is then assigned an object number that is a product of the group numbers (namely, the primes) of the groups having access to the object. To determine whether a given user may access a given object, the method evaluates a greatest common divisor of the given user's user number and the given object's object number. The given user is permitted access to the given object if the greatest common divisor is greater than a predetermined value (namely, one) indicating that the user number and the object number have no common factors. On the contrary, the given user is denied access to the given object if the greatest common divisor is the predetermined value. In one embodiment, the greatest common divisor is evaluated using a known function, such as Euclid's algorithm.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 is a representative group based access control model in which the present invention is implemented;

FIG. 4 is a table illustrating the group numbers and group attributes of the users and objects identified in FIG. 3; and FIG. 5 is a further illustrative example of the invention as applied to a particular group based access control model.

DETAILED DESCRIPTION OF THE PREFERRED EMBODIMENT

The inventive access control method may be implemented within a given computer system. As is well-known, access control protects the privacy and integrity of information resource objects in the computer system. Typically, such objects comprise files, programs, memory segments, processor cycles, devices, or the like. The control method preferably is implemented within a known "group based" access control model.

Figure 1:
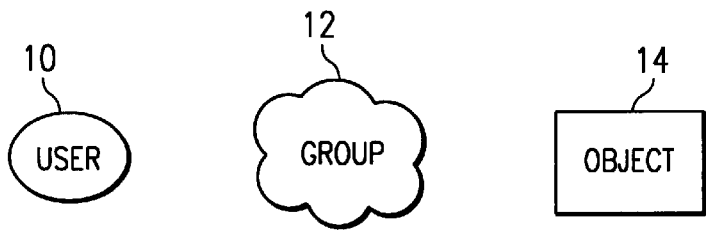
FIG. 1 is a simplified diagram of the component types of a group based access control model.

As illustrated in FIG. 1, the known group based access control model involves three (3) types of entities: user 10, group 12, and object 14. A user is the entity who can access an object with some operations. Each user typically belongs to a number of groups. A group is the entity solely defined for the purpose of access control. Each group typically contains as its members a number of users. An object is the entity that can be accessed by a user. Each object can be accessed with a number of operations, depending upon the object's type. Thus, for example, a "file" object is accessed by one of the create/read/write/execute/remove operations, while a "database record" object is accessed by one of the add/modify/search/compare/delete operations. Access control on each operation of an object is group based, i.e. whether a user can access an object with an operation depends upon the groups to which the user belongs. Therefore, each object needs to be associated. with some access control information that indicates what group of users are allowed to access the object and in what ways (operations).

Therefore, a common technique to minimize the burden on an administrative staff is to assign the users to groups. Groups are administratively convenient because it is common that large numbers of users will have common access needs. Therefore, by assigning a user to a particular group, the systems administrator can provide access to a large number of resources that are grouped together because of common needs.

A representative computer system in which the present invention is implemented comprises one or more client machines connected to one or more servers across a computer network. A representative computer includes an x86-, PowerPC®- or RISC-based processor, an operating system such as IBM® OS/2® or Microsoft Windows '95, RAM storage, disk storage, input/output devices (e.g., a keyboard, display, mouse, printer, etc.), various application programs, communications devices, and other known hardware, software, network operating systems and the like. The present invention may be conveniently implemented in software, namely, as a series of computer instructions that effect the various functions described below.

Figure 2:
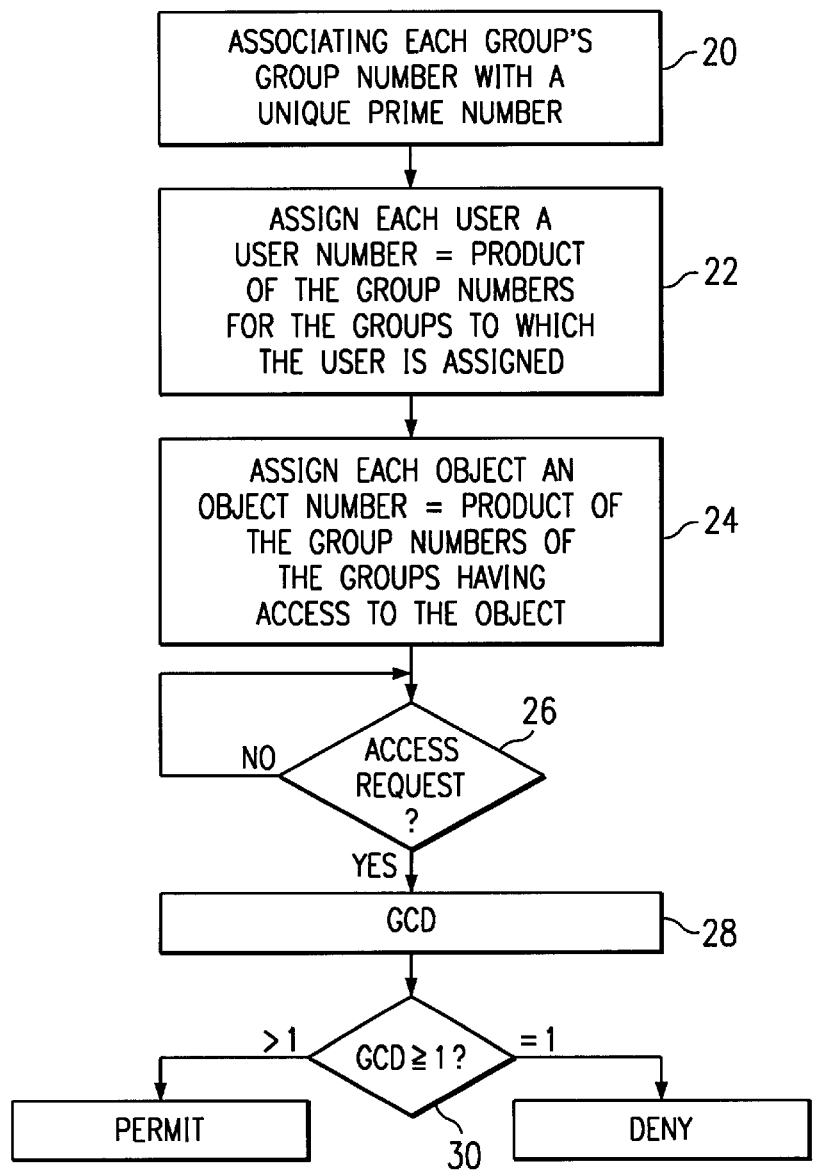
FIG. 2 is a flowchart of an illustrative embodiment of the present invention.

FIG. 2 illustrates a flowchart of one preferred method for controlling access to information resource objects within a computer system that is operative within an group based access control model. At step 20, and for each of a plurality of access groups to which one or more users are assigned, the method begins by associating each access group's group number with a unique prime number greater than one. At step 22, each user is assigned a user number that is a product of the group numbers (namely, the unique prime numbers) for the groups to which the user is assigned. At step 24, each information resource object is assigned an object number that is a product of the group numbers (namely, the unique prime numbers) of the groups having access to the object. Steps 22 and 24 may be reversed. At step 26, a test is run to determine whether a given user desires to access a given information object. If the outcome of the test at step 26 is negative, the routine cycles. If, however, the outcome of the test at step 26 is positive, the routine continues at step 28 to determine the greatest common divisor between the given user's user number and the given object's object number. At step 30, a test is performed to determine if the greatest common divisor is greater than or equal to one (the lowest possible prime). If the greatest common divisor is greater one, the routine branches to step 32 to permit access to the information resource object. If the greatest common divisor is one, the routine continues at step 34 to deny the given user access to the information resource object.

Thus, according to the described embodiment of the present invention, an access control method uses a grouping system whereby each group is assigned a prime number greater than one. Resource objects to which a group has access are assigned an object number that is determined by multiplying all group prime numbers from the groups that have access to that resource object. Also, each user is assigned to one or more groups. Each user has a user number that is a product of the prime numbers assigned to each group. When a particular user desires to have access to a particular resource object, the greatest common divisor between the resource object number and the user number is determined. If the resulting greatest common denominator is greater than one, then access is granted. If the greatest common divisor is one, then access is denied.

The following is a detailed description of the data that is preferably created for each entity (user, group, object) to support the inventive mechanism.

Each group $G_i$ is assigned a unique "group number", $P_{Gi}$, which must be a prime. Each user $U_i$ is associated with a user number or "group attribute", $M_{Ui}$, which is a multiple of the $P_{Gi}$'s of all the groups to which the user belongs. That is, $M_{Ui}=P_{G1}*P_{G2}*P_{G3}* \ldots *P_{Gk}$, where $G_1, G_2, G_3, \ldots, G_k$ are all the groups to which the user belongs. Each access operation A of an object $O_i$ is associated with an object number or "group attribute", $M_{Oi\_A}$, which is a multiple of the $P_{Gi}$'s of all the groups that are allowed to perform access operation A on the object $O_i$. That is, $M_{Oi\_A}=P_{G1}*P_{G2}*P_{G3}* \ldots *P_{Gk}$, where $G_1, G_2, G_3, \ldots, G_k$ are all the groups whose members are allowed to perform the access operation A on the object.

According to the present invention, various access control activities are performed efficiently using this data. Each access control activity is described by one question, depending on the information already known, as now described.

The question of "whether a user $U_i$ belongs to a group $G_i$?" can be answered easily by just testing if $P_{Gi}$ divides $M_{Ui}$. This is helpful when it is already known that an object $O_i$ is accessible by group $G_i$, and, in such case, whether user $U_i$ can access object $O_i$ depends on whether user $U_i$ is a member of group $G_i$.

The question of "whether an object $O_i$ can be accessed with an operation A by a group $G_i$?" can be answered easily by just testing if $P_{Gi}$ divides $M_{Oi\_A}$. This is helpful when it is already known that a user $U_i$ belongs to group $G_i$, and, in such case, whether user $U_i$ can access object $O_i$ with operation A depends on whether object $O_i$ can be accessed with operation A by group $G_i$.

A more general question is "whether a user $U_i$ belongs to a group $G_i$ which is allowed to perform an access operation A on an object $O_i$?". The intuitive way based on the first approach above is to first enumerate all the groups that can access object $O_i$ with operation A (therefore one needs to keep all the group information with the object) and then check if $P_{Gi}$ of any group divides $M_{Ui}$. The intuitive way based on the second approach above is to first enumerate all the groups the user belongs to (therefore one needs to keep all the group information with the user) and then check if $P_{Gi}$ of any group divides $M_{Oi\_A}$. Either way requires storing detailed group information with either each user or each object and enumerating all the groups of a user or an object when an access request is made.

According to the present invention, this question is answered in a computationally efficient manner by obtaining the GCD (Greatest Common Divisor) of $M_{Ui}$ of the user and $M_{Oi\_A}$ of the object. If GCD($M_{Ui}$, $M_{Oi\_A}$) is any number greater than 1 (which means $M_{Ui}$ and $M_{Oi\_A}$ have common factors), the user is allowed to access the object. If, however, GCD($M_{Ui}$, $M_{Oi\_A}$) is 1 (which means $M_{Ui}$ and $M_{Oi\_A}$ have no common factors), the user's access request is denied.

FIG. 3 illustrates a representative group based access control model. This particular model assumes there are four users ($U_1$, $U_2$, $U_3$, and $U_4$), three groups ($G_1$, $G_2$ and $G_3$), and two objects ($O_1$ and $O_2$). The group membership information and access control information is shown by the links among various entities in the drawing. The group numbers of the groups and the group attributes of the users and objects are set forth in FIG. 4 (for the reason of simplicity, it is assumed there is only one access operation with an object or all the access operations of an object share the same group attribute).

Returning to the example questions set forth above, one of ordinary skill will appreciate that the first two questions can be answered quickly by the solutions stated. To demonstrate how the solution of the third question works, it is assumed $U_1$ attempts to access to $O_2$. This access request, however, will be denied because GCD($M_{U1}$, $M_{O2}$)=1. However, if $U_4$ attempts to access to $O_1$, its access request will be authorized since GCD($M_{U4}$, $M_{O1}$)=6.

The are several well-known and efficient algorithms (e.g., Euclid's algorithm) that compute the GCD of two numbers a and b in only O(log(min(a, b))) time. Euclid's theorem states that the greatest common denominator of two numbers a and b is equal to the greatest common divisor or denominator of the smaller of the two numbers and the remainder when the smaller of the two numbers is divided into the larger of the two numbers. This algorithm is set forth below for the numbers a and b:

(define (GCD a b)(if (=b 0)a(GCD b (remainder a b)))).

This routine generates an iterative process, whose number of steps grows as the logarithm of the numbers involved.

For example, assume a is equal to 206, and b is equal to 40. Then GCD(206,40)=GCD(40,6). Forty is divided into 206 five times with the remainder of 6. This operation is then applied to GCD(40,6). Six goes into 40 six times with a remainder of 4, so GCD(40,6)=GCD(6,4). This process is applied again to determine that GCD(6,4)=GCD(4,2), which is equal to GCD(2,0). Thus, the greatest common divisor of 206 and 40 is 2.

This analysis may be readily applied to a concrete example as illustrated in FIG. 5. In this example, $G_1$, $G_2$ and $G_3$ are 2, 3 and 5, respectively, and thus $U_1$, $U_2$, $U_3$, and $U_4$), are 2, 6, 3 and 30, respectively. The two objects $O_1$ and $O_2$ are 6 and 15, respectively. Continuing with the above example, assume user $U_4$ desires to access object $O_2$. Using Euclid's theorem, GCD(30,15)=GCD(15,0). Thus, the greatest common divisor between the user number of $U_4$ and resource object number $O_2$ is 15. As this number is greater than 1, access is allowed for $U_4$. On the other hand, assume user $U_1$, desires to access resource $O_2$; Euclid's theorem thus is calculated as follows: GCD(15,2)=GCD(2,1)=GCD(1,0). Therefore, the greatest common divisor between the user number for $U_1$, and the resource object for $O_2$ is 1. Therefore, access to resource $O_2$ is denied to $U_1$.

The present invention provides numerous advantages over the traditional ACL based mechanism. The technique exhibits substantial better performance. In particular, each object authorization based on group information is much more efficient with the new mechanism. This is because a simple numerical computation takes much less time than loading a potential long ACL and performing (group name) string comparisons. Moreover, the present invention requires less storage as each user and object preferably is associated with a single integer (group attribute) instead of a lengthy group list or ACL (to represent its group information).

Further, the inventive scheme has lower administration costs than the prior art. Specifically, the process to achieve group administration for users is relatively inexpensive. Adding a user $U_i$ to a group $G_i$ can be done by simply multiplying the user's group attribute ($M_{Ui}$) by the group's group number ($P_{Gi}$), and removing a user $U_i$ from a group $G_i$ can be done by simply dividing $M_{Ui}$ by $P_{Gi}$. Similarly, the process to achieve access control administration for objects is also low-cost. Granting a group $G_i$ an access A to an object $O_i$ and revoking a group's access to an object can be easily done by multiplying $M_{Oi\_A}$ by $P_{Gi}$ and dividing $M_{Oi\_A}$ by $P_{Gi}$, respectively.

Finally, the present invention is advantageous because it may coexist with traditional ACL mechanism. This is highly beneficial in situations where it may not be desired to completely replace the original ACL based mechanism within existing systems and application (maybe for other administration purposes). In such case, significant performance advantages are still available by just complementing the ACL based mechanism with the inventive prime based mechanism, at a minimal cost.

Although the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would, recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

One of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

Although the present invention has been illustrated with respect to a preferred embodiment, the inventive technique is not limited to any particular purpose of the access request, as there may be many different types and reasons to access a given information resource object (any of which may use the authorization scheme). Thus, the particular access request or operation to be performed on the information resource object is not a limitation of the present invention.

Having thus described my invention, what I claim as new and desire to secure by Letters Patent is set forth in the following claims:

1. In a group based access control mechanism wherein each of a plurality of access control groups has an associated group number and a set of one or more users assigned thereto, a method for controlling access to objects, comprising the steps of:

associating each group's group number with a unique prime number;

assigning each user a user number that is a given function of the group numbers for the groups to which the user is assigned;

assigning each object an object number that is a given function of the group numbers of the groups having access to the object; and determining a greatest common divisor of a given user's user number and a given object's object number to determine whether the given user may access the given object.

2. The method as described in claim 1 wherein the given function is a product.

3. The method as described in claim 1 further including the step of:

permitting the given user to access the given object if the greatest common divisor is greater than a predetermined value indicating that the user number and the object number have no common factors.

4. The method as described in claim 3 wherein the given object is a file.

5. The method as described in claim 4 wherein the given object is accessed for a given operation selected from the set of operations consisting essentially of create, read, write, execute and remove.

6. The method as described in claim 1 further including the step of:

denying the given user access to the given object if the greatest common divisor is the predetermined value.

7. The method as described in claim 1 wherein the greatest common divisor is evaluated using Euclid's theorem.

8. A method for controlling access to objects, comprising the steps of:

for each of a plurality of access groups to which one or more users are assigned, associating each access group's group number with a unique prime number;

assigning each user a user number that is a product of the group numbers for the groups to which the user is assigned;

assigning each object an object number that is a product of the group numbers of the groups having access to the object;

permitting a given user to access a given object if a numerical computation derived from the given user's user number and the given object's object number is a predetermined value.

9. The method as described in claim 8 wherein the numerical computation generates a greatest common divisor of the given user's user number and the given object's object number.

10. A computer program product in a computer readable medium for use in a group based access control mechanism wherein each of a plurality of access control groups has an associated group number and a set of one or more users assigned thereto, the computer program product comprising:
   means for associating each group's group number with a unique prime number greater than one;
   means for assigning each user a user number that is a product of the group numbers for the groups to which the user is assigned;
   means for assigning each object an object number that is a product of the group numbers of the groups having access to the object; and
   means for determining a greatest common divisor of a given user's user number and a given object's object number to determine whether the given user may access the given object.

11. The computer program product as described in claim 10 further including:
   means for permitting the given user to access the given object if the greatest common divisor is greater than a predetermined value indicating that the user number and the object number have no common factors.

12. The computer program product as described in claim 10 further including:
   means for denying the given user access to the given object if the greatest common divisor is the predetermined value.

13. The computer program product as described in claim 10 wherein the greatest common divisor is evaluated using a numerical computation.

14. The computer program product as described in claim 13 wherein the numerical computation is Euclid's algorithm.

15. In a group based access control mechanism wherein each of a plurality of access control groups has an associated group number and a set of one or more users assigned thereto, the improvement comprising:
   means for associating each group's group number with a unique prime number greater than one;
   means for assigning each user a user number that is a product of the group numbers for the groups to which the user is assigned;
   means for assigning each object an object number that is a product of the group numbers of the groups having access to the object; and
   means for evaluating a greatest common divisor of a given user's user number and a given object's object number to determine whether the given user may access the given object.

16. In the group based access control mechanism of claim 15, wherein the improvement further includes:
   means for permitting the given user to access the given object if the greatest common divisor is greater than a predetermined value indicating that the user number and the object number have no common factors.

17. In the group based access control mechanism of claim 15, wherein the improvement further includes:
   means for denying the given user access to the given object if the greatest common divisor is the predetermined value.

18. A group based access control mechanism wherein each of a plurality of access control groups has an associated group number and a set of one or more users assigned thereto, comprising:
   means for associating each group's group number with a unique prime number greater than one;
   means for assigning each user a user number that is a product of the group numbers for the groups to which the user is assigned;
   means for assigning each object an object number that is a product of the group numbers of the groups having access to the object;
   means for evaluating a greatest common divisor of a given user's user number and a given object's object number; and
   means for permitting the given user to access the given object if the greatest common divisor is greater than a predetermined value indicating that the user number and the object number have no common factors.

19. A method for managing a group, comprising the steps of:
   for each of a plurality of access groups to which one or more users are assigned, associating each access group's group number with a unique prime number $P_{Gi}$;
   assigning each user a number $M_{Ui}$ that is a product of the group numbers for the groups to which the user is assigned;
   assigning each object $O_i$ a number $M_{Oi\_A}$ that is a product of the group numbers of the groups having access to the object;
   determining whether a given user $U_i$ belongs to a given group $G_i$ by testing if $P_{Gi}$ divides $M_{Ui}$.

20. A method of managing a group, comprising the steps of:
   for each of a plurality of access groups to which one or more users are assigned, associating each access group's group number with a unique prime number $P_{Gi}$;
   assigning each user a number $M_{Ui}$ that is a product of the group numbers for the groups to which the user is assigned;
   assigning each object a number $M_{Oi\_A}$ that is a product of the group numbers of the groups having access to the object;
   determining whether an object $O_i$ can be accessed with an operation by a group $G_i$ by testing if $P_{Gi}$ divides $M_{Oi\_A}$.

* * * * *